United States Patent [19]
Sakai et al.

[11] Patent Number: 5,225,690
[45] Date of Patent: Jul. 6, 1993

[54] GAP MEASURING DEVICE AND METHOD USING FRUSTRATED INTERNAL REFLECTION

[75] Inventors: Takamasa Sakai; Motohiro Kouno; Sadao Hirae; Ikuyoshi Nakatani, all of Kyoto, Japan

[73] Assignee: Dainippon Screen Mfg. Co., Ltd., Japan

[21] Appl. No.: 707,152

[22] Filed: May 29, 1991

[30] Foreign Application Priority Data

May 29, 1990 [JP] Japan .................... 2-139296

[51] Int. Cl.$^5$ ............................ G01N 21/86
[52] U.S. Cl. ...................... 250/561; 359/222; 356/375
[58] Field of Search ............. 250/561, 227.21, 231.19, 250/225; 359/222; 356/373, 445, 135, 375

[56] References Cited

U.S. PATENT DOCUMENTS

| | | | |
|---|---|---|---|
| 4,083,254 | 4/1978 | Nissl | 359/222 |
| 4,322,979 | 4/1982 | Fromm | 359/222 |
| 4,490,618 | 12/1984 | Cielo | 250/571 |
| 4,681,451 | 7/1987 | Guerra et al. | 356/373 |
| 5,125,740 | 6/1992 | Sato et al. | 356/135 |

FOREIGN PATENT DOCUMENTS 2205046 8/1990 Japan .
9004753 5/1990 PCT Int'l Appl. .

OTHER PUBLICATIONS

J. Appl. Phys.; Durig et al., vol. 59, No. 10, May 15, 1986 "Near Field Optical Scanning Microscopy" pp. 3318–3327.

Patent Abstracts of Japan; vol. 11, No. 334, (p. 631) Oct. 31, 1987 & JP A 62 116 204 (Netto Electric Company Ltd. May 27, 1987 *abstract*.

Emil Kamineniecki, J. Appl. Phis. vol. 54, No. 11, pp. 6481–6487, Nov. 1983 Model SCA-H Surface Charge Analyzer Brochure by Semi-Test.

Primary Examiner—David C. Nelms
Assistant Examiner—K. Shami
Attorney, Agent, or Firm—Ostrolenk, Faber, Gerb & Soffen

[57] ABSTRACT

A narrow gap or unevenness of a surface of a specimen is measured by utilizing the tunnel effect of a light wave reflected at a boundary plane on the condition of total reflection. A laser beam emitted from a laser source is reflected at a surface of a prism on the condition of total reflection in terms of geometrical optics. If a gap between the surface of the prism and the specimen is about the wavelength of the laser beam, part of the laser beam is transmitted into the specimen, and the intensity of the transmitted beam depends on the gap width. A portion of the laser beam is reflected at the boundary plane back into the prism. Therefore, the gap can be measured by measuring the transmittance of the laser beam and comparing the same with the calculated relation between the transmittance and the gap calculated in advance. In practice, the gap width is determined by measuring intensity of the reflected laser beam in the presence of the gap and comparing it to the intensity of the reflected laser beam in the absence of the gap, i.e, when the specimen surface is more than several wavelengths away from the reflecting surface.

58 Claims, 13 Drawing Sheets n1 = 1.5103   k1 = 0.0 (BK7)

n2 = 1.0      k2 = 0.0 (AIR)

n3 = 3.673    k3 = 0.005 (SILICON)

$\lambda$ = 0.827 $\mu$m (GaAℓAs LASER)

$\theta 1$ = 45°

$\log Rt = -2.642 G - 0.135$ s-POLARIZED LIGHT n1 = 1.5103   k1 = 0.0 (BK7)

n2 = 1.0      k2 = 0.0 (AIR)

n3 = 3.673    k3 = 0.005 (SILICON)

λ = 0.827 μm (GaAℓAs LASER)

θ1 = 45°

GAP MEASURING DEVICE AND METHOD USING FRUSTRATED INTERNAL REFLECTION

BACKGROUND OF THE INVENTION

1. Field of the Invention

The present invention relates to a gap measuring device and a gap measuring method for measuring a narrow gap utilizing the tunnel effect of light wave reflected at a boundary plane on the condition of total reflection.

2. Description of the Prior Art

High-precision laser range finders such as Michelson interferometers are used for precise measurement of distances utilizing the interference of laser beams. The high-precision laser range finders determine a distance based on the principle that the number of interference fringes formed due to the interference of laser beams is directly proportional to a displacement of a movable mirror (or a rectangular prism).

High-precision laser range finder are, however, not suitable for measuring a gap between a mask and a wafer or for measuring unevenness of the wafer in the printing process, i.e., in printing a mask pattern onto the wafer in semiconductor manufacture. The high-precision laser range finders require movement of the movable mirror in response to the dimension of the gap between the mask and the wafer or to the degree of the wafer unevenness; this is, however, impossible when the dimension of the gap or the unevenness is unknown.

Thus, there are substantially no apparatus for precisely measuring a narrow gap or unevenness on a surface.

SUMMARY OF THE INVENTION

An object of the present invention is to provide a gap measuring device and a gap measuring method for precisely measuring a narrow gap or unevenness on a surface.

The present invention is directed to a gap measuring device for measuring a gap between a surface of a specimen and a specific member comprising: a laser source for emitting a laser beam; a light transmission reflector having a reflecting surface as the specific member located virtually in parallel with the surface of the specimen across a gap for reflecting the laser beam at the reflecting surface on the condition of total reflection in terms of geometrical optics; a photosensor for measuring intensity of the laser beam reflected by the reflector; a base on which the laser source, the reflector, and the photosensor are mounted; a first driving mechanism for relatively moving at least either of the base and the specimen in a first direction defining the gap; and gap determining means for determining the gap on the basis of the intensity of the laser beam measured by the photosensor.

Preferably, the gap determining means compares the intensity with a calculated value of the intensity according to Maxwell's equations on the condition of the total reflection with respect to the gap, thereby determining the gap.

According to an aspect of the present invention, the gap measuring device comprises: a second driving mechanism for relatively moving at least either of the base and the specimen in a second direction perpendicular to the first direction.

The first drive mechanism may relatively move the base and the specimen so that a value of the gap determined by the gap determining means becomes equal to a prescribed value, thereby maintaining the gap at the prescribed value.

The gap determining means may further determine unevenness of at least a part of the surface of the specimen on the basis of movement of the first drive mechanism in the first direction at each position in the part.

The gap may be in the range of one tenth of a wavelength of the laser beam to two times the wavelength. Further, the gap may be less than 1 $\mu$m. The laser beam may preferably be linearly polarized light. The first and second driving mechanisms may comprise a piezoelectric element, and the light transmission reflector may comprise a prism.

The present invention is also directed to a gap measuring method for measuring a gap between a surface of a specimen and a specific member comprising the steps of: (a) emitting a laser beam incident on a reflecting surface of a light transmission reflector, the reflecting surface being the specific member located virtually in parallel with the surface of the specimen across a gap; (b) reflecting the laser beam by the reflecting surface on the condition of total reflection in terms of geometrical optics; (c) measuring intensity of the laser beam reflected by the reflecting surface; and (d) determining the gap on the basis of the intensity of the laser beam.

Preferably, the step (d) comprises the steps of: (e-1) comparing the intensity with a calculated value of the intensity according to Maxwell's equations on the condition of the total reflection with respect to the gap; and (e-2) determining the gap on the basis of the comparison.

Alternatively, the step (d) may comprise the step of: (d-1) relatively moving the light transmission reflector and the specimen in a direction defining the gap so that a value of the gap becomes equal to a prescribed value, thereby maintaining the gap at the prescribed value.

The step (d-1) may be performed at plural positions of at least a part of the surface of the specimen, and the step (d) may further comprise the step of: (d-2) determining unevenness of the part on the basis of relative movement of the light transmission reflector and the specimen in the direction at each position in the part.

The "measuring a gap" stated above includes both measuring an absolute value of the gap and detecting whether the gap equals a prescribed value.

The "measuring unevenness" includes both measuring absolute value of unevenness on the surface and detecting whether the depth of the unevenness equals a prescribed depth.

When a gap between the reflecting surface of the reflector and the specimen is substantially the same in size as the wavelength of the laser beam while the laser beam is reflected by the reflector on the condition of total reflection in terms of geometrical optics, part of the laser beam reflected at the reflecting surface is transmitted into the specimen through the gap; this is called Tunnel effect and the details will be described later.

The intensity of light transmitted into the specimen varies with the dimension of the gap. This is the same with the laser beam reflected at the reflecting surface of the reflector. The dimension of the gap or the unevenness on the surface can therefore be found by measuring the intensity of the reflected light.

These and other objects, features, aspects and advantages of the present invention will become more apparent from the following detailed description of the present invention when taken in conjunction with the accompanying drawings.

DESCRIPTION OF THE PREFERRED EMBODIMENTS

The tunnel effect of a light wave on the condition of total reflection first will be explained below. Then gap measuring apparatus and surface unevenness detecting apparatus embodying the present invention will be explained thereafter.

The tunnel effect is generally observed in physical phenomena expressed by a wave function, including reflection of light. More specifically, when boundary conditions are provided on the boundary plane of a medium, the wave function exponentially damps outside the boundary plane. This means that the wave oozes or tunnels from the boundary plane as far as its wavelength.

When light is incident on an optically thin medium, e.g., air, from an optically dense medium e.g., glass, at an incident angle greater than its critical angle, total reflection in terms of geometrical optics is observed. When the propagation of light (or electric field) is expressed by a wave function, the wave function representing the light (or the electric field) is transmitted into the optically thin medium (or the air) in spite of the total reflection condition in terms of geometrical optics.

Figure 2:
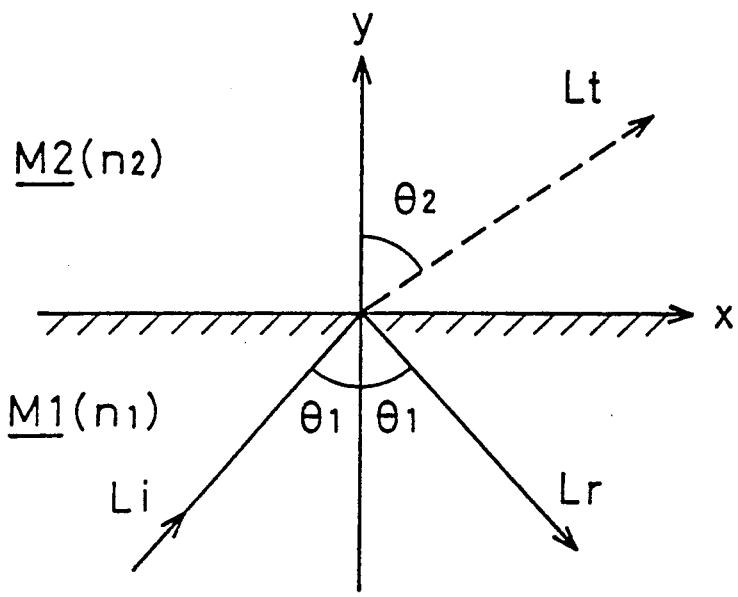
FIG. 2 is a diagram showing an optical path of light transmitted into a double layer structure.

FIG. 2 is a diagram showing an optical path of light transmitted from an optically dense medium M1 to an optically thin medium M2. Incident light Li is linearly polarized light having a polarization direction in the x-y plane. In other words, its electrostatic vector is parallel to the x-y plane. The incident light Li is incident on a boundary between the media M1 and M2 at an incident angle $\theta 1$. Refractive indices of the medium M1 and the medium M2 are n1 and n2, respectively. FIG. 2 shows light Lt oozing into the medium M2 at an angle $\theta 2$ as well as reflected light Lr although this figure satisfies the total reflection condition in terms of geometrical optics. The electric field Et of the through-light Lt is expressed by the following wave function:

$$Et = E0 * \exp(-kt*\alpha*y)$$
$$\exp[i*\{kt(n1/n2)\sin\theta 1*x - \omega*t\}] \quad \ldots (1)$$

where E0 is a constant; kt and $\alpha$ are constants expressed by the following equations (2) and (3), respectively;

$\omega$ represents angular frequency of the light; and the operator "*" denotes multiplication.

$$kt = n2 * (2 * \tau)/\lambda \ldots \quad (2)$$

$$\alpha = [(n1/n2)^2 * (\sin\theta 1)^2 - 1]^{0.5} \quad \ldots (3)$$

where $\lambda$ denotes a wavelength of the light.

In equation (1), the term $\exp(-kt*\alpha*y)$ shows that the electric field of the light wave is transmitted into the medium M2 and the amplitude of the electric field $|Et|$ exponentially and monotonously decreases in a distance as far as the wavelength $\lambda$.

Equations used here are equivalent to the equations shown in Fineman, Rayton, and Sanz, "Fineman Physics", Vol. IV, Electromagnetic Wave and Properties (Japanese version); Iwanami, Mar., 1986; page 196, line 20.

If the medium M2 is air, n2 is equal to 1.0 and the equations (1) through (3) are rewritten as the following equations (1a) through (3a):

$$Et = E0 * \exp(-kt*\alpha*y)\exp[i*\{kt*n1*\sin\theta 1*x - \omega*t\}] \quad \ldots (1a)$$

$$kt = (2\pi)/\lambda \quad \ldots (2a)$$

$$\alpha = [(n1*\sin\theta 1)^2 - 1]^{0.5} \quad (3a)$$

Figure 3:
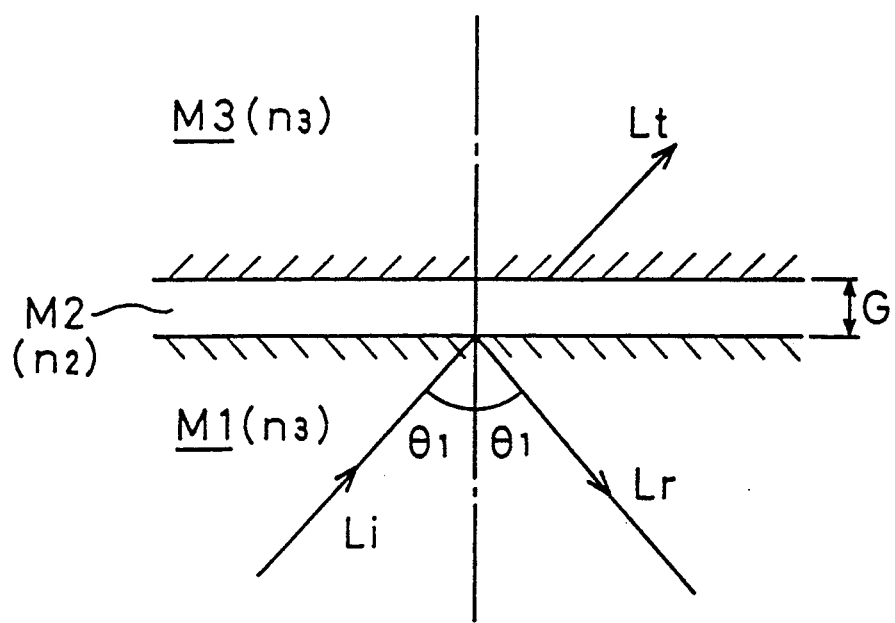
FIG. 3 is a diagram showing an optical path of light transmitted into a triple layer structure.

Suppose that, from the state of FIG. 2, another optically dense medium M3 approaches from in the air M2 down to the medium M1, as shown in FIG. 3. When a gap G between the medium M1 and the third medium M3 decreases to be approximately equal to the wavelength $\lambda$, dipole moment of the third medium M3 is excited and the light wave begins to be transmitted into the third medium M3. The electric field of the light Lt transmitted into the third medium M3 is approximated by the equations (1a) through (3a) stated above. Here the intensity of the transmitted light Lt is known to be proportional to the square of the amplitude $|Et|$ of the electric field.

The gap G can be found from the relation between the intensity of the transmitted light Lt and the gap G according to the equations (1a) through (3a); namely, the gap G can be measured by calculating in advance the relation between the intensity of the transmitted light Lt and the gap G, and by substituting the observed intensity of the transmitted light Lt in the relation. For more precise calculation of the electric field Et of the transmitted light Lt, Maxwell's equations, in stead of the equations (1a) through (3a), will be required to be solved on the boundary conditions for the three layer structure consisting of the three media M1, M2, and M3. The calculation can be executed with a computer; a computer program applicable to the calculation is, for example, shown in Tohru Kusakawa, "Lens Optics", Tokai University Press, 1988, pages 295-310.

Practically, the intensity of the reflected light Lr is measured in stead of the intensity of the light Lt transmitted into the optically dense medium M3 on account of the difficulty in measurement of the latter. The relation among the intensities Pi, Pr, and Pt of the incident light Li, the reflected light Lr, and the transmitted light Lt, respectively, is expressed as follows:

$$Pt/Pi = 1 = Pr/Pi \quad \ldots (4)$$

Table 1 shows the reflectance Rr (=Pr/Pi) of the reflected light Lr given by the precise calculation of the electric field of the light wave propagated through the three layer structure. Results in Table 1 are for s-polarized light, p-polarized light and linearly polarized light having a polarization direction at an angle of 45 degrees to each of s- and p-polarized light (hereinafter referred to as s+p polarized light).

TABLE 1

| Gap | Reflectance Rr (= Pr/Pi) | | |
|---|---|---|---|
| G(μm) | s-polarized | p-polarized | s + p polarized |
| 0.0 | 0.285 | 0.081 | 0.183 |
| 0.1 | 0.508 | 0.152 | 0.330 |
| 0.2 | 0.758 | 0.325 | 0.542 |
| 0.3 | 0.881 | 0.524 | 0.702 |
| 0.4 | 0.939 | 0.691 | 0.815 |
| 0.5 | 0.967 | 0.810 | 0.889 |
| 0.6 | 0.982 | 0.887 | 0.935 |
| 0.7 | 0.990 | 0.934 | 0.962 |
| 0.8 | 0.994 | 0.962 | 0.978 |
| 0.9 | 0.997 | 0.979 | 0.988 |
| 1.0 | 0.998 | 0.988 | 0.993 |

Conditions for Table 1 are as follows:
n1 = 1.5103, k1 = 0.0 (borosilicate glass, BK7)
n2 = 1.0, k2 = 0.0 (air)
n3 = 3.673, k3 = 0.005 (silicon)
λ = 0.827 μm (GaAlAs laser)
θ1 = 45 degrees
where k1, k2, and k3 denote extinction coefficients of the media M1 (BK7), M2 (air), and M3 (silicon), respectively.

Any linearly polarized light can be separated into an s-polarized light component and a p-polarized light component. When the polarization direction of a linearly polarized light deviates at an angle of θ to that of the s-polarized light, the reflectance Rra of the linearly polarized light is a function of the reflectance Rrs of the s-polarized light and the reflectance Rrp of the p-polarized light as given below:

$$Rra = \cos^2\theta \cdot Rrs + \sin^2\theta \cdot Rrp \qquad \ldots (5)$$

Figure 4A:
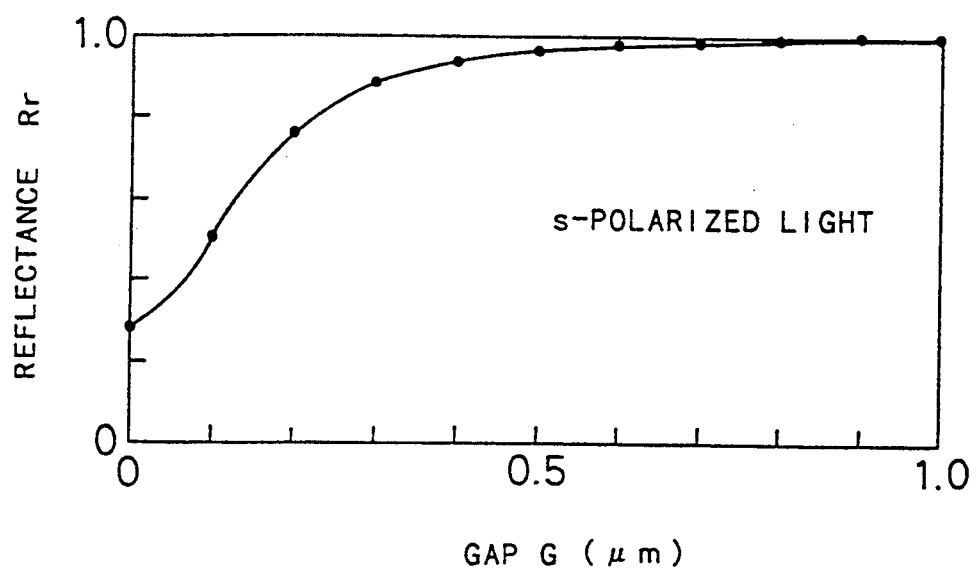
FIGS. 4A through 4C are graphs showing the reflectance plotted against the dimension of a gap.
Figure 4B:
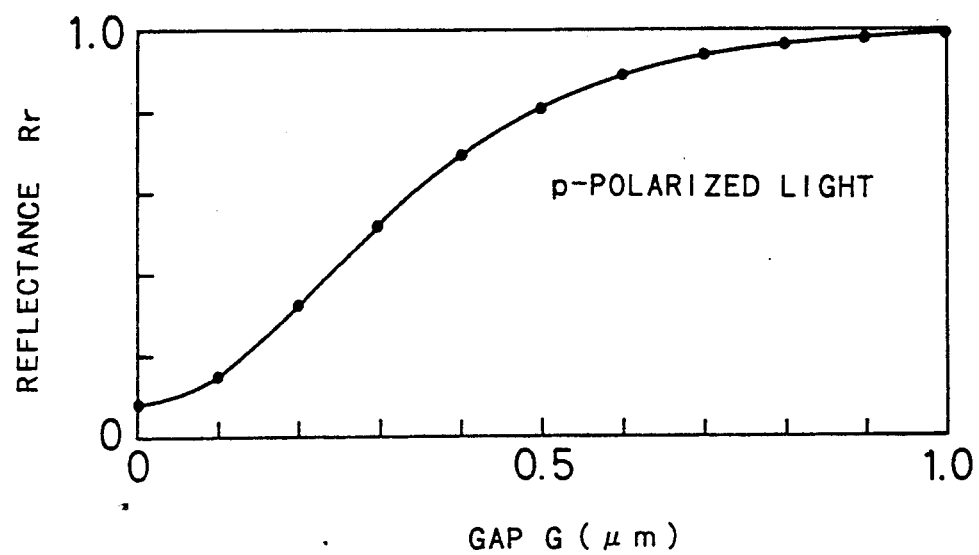
Figure 4C:
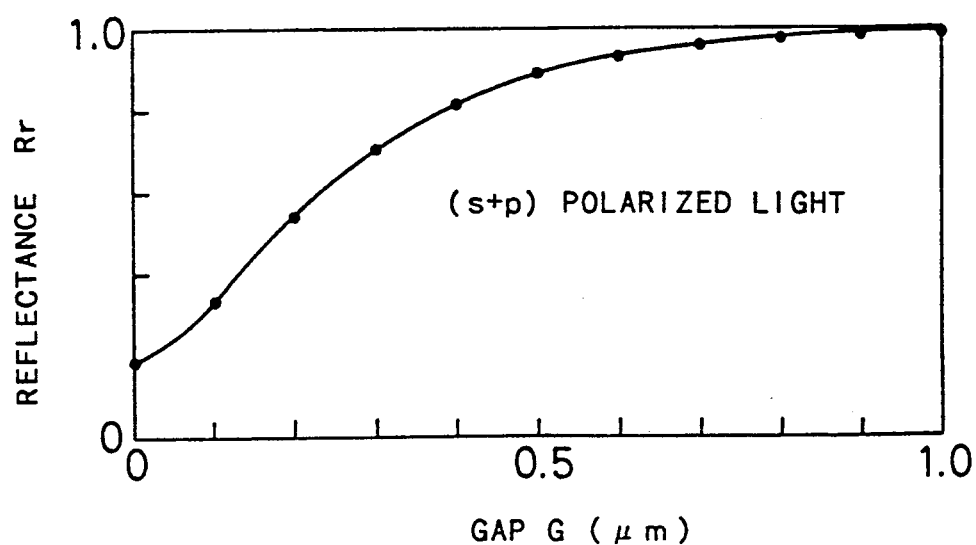

FIGS. 4A through 4C are graphs showing the relations in Table 1. In these graphs, the abscissa is the gap G and the ordinate is the reflectance Rr. When the gap G is far larger than the wavelength λ, the reflectance Rr is approximately 100% which means total reflection. When the gap G is equal to zero, on the other hand, the reflectance Rr is close to zero, which means that almost all of light is transmitted.

Figure 5A:
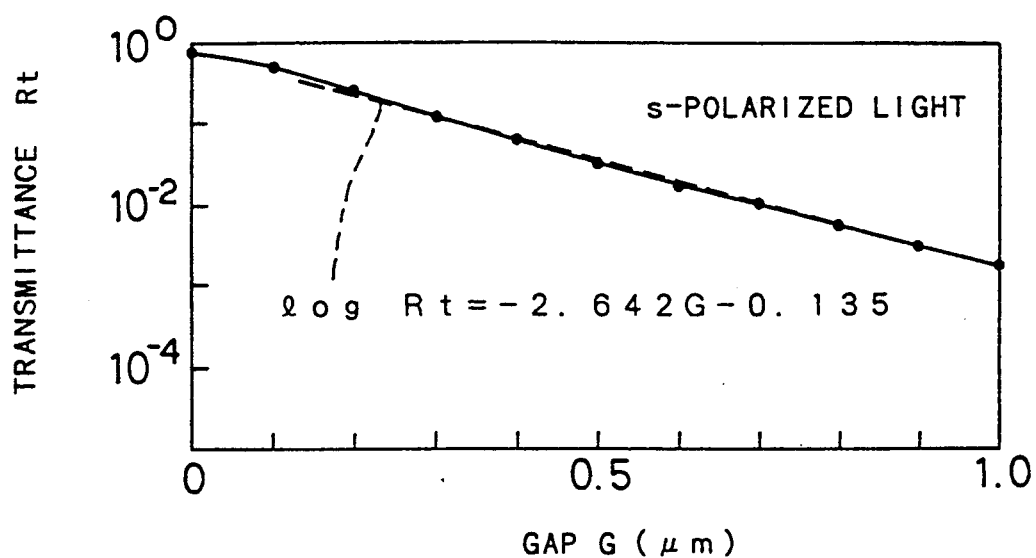
FIGS. 5A through 5C are graphs showing the transmittance plotted against the dimension of a gap.
Figure 5B:
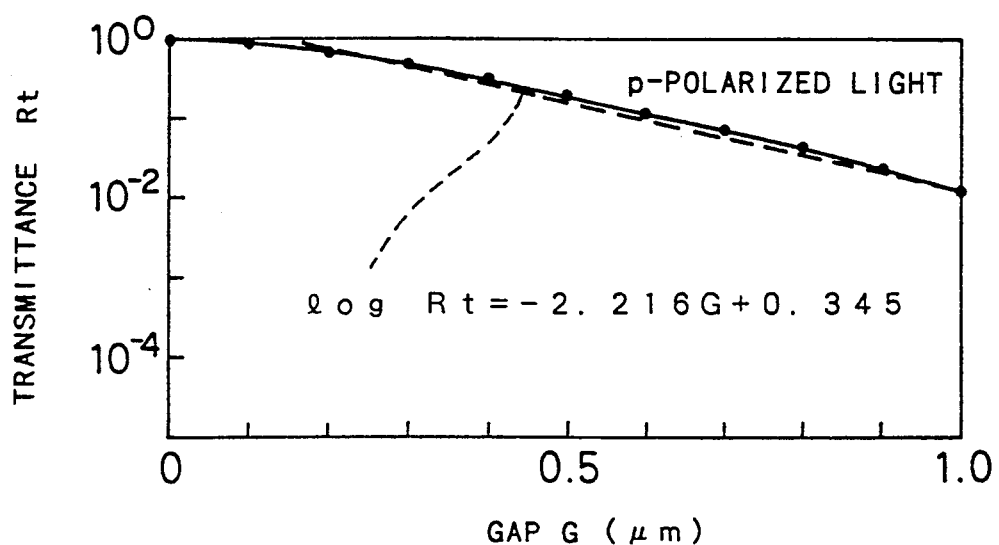
Figure 5C:
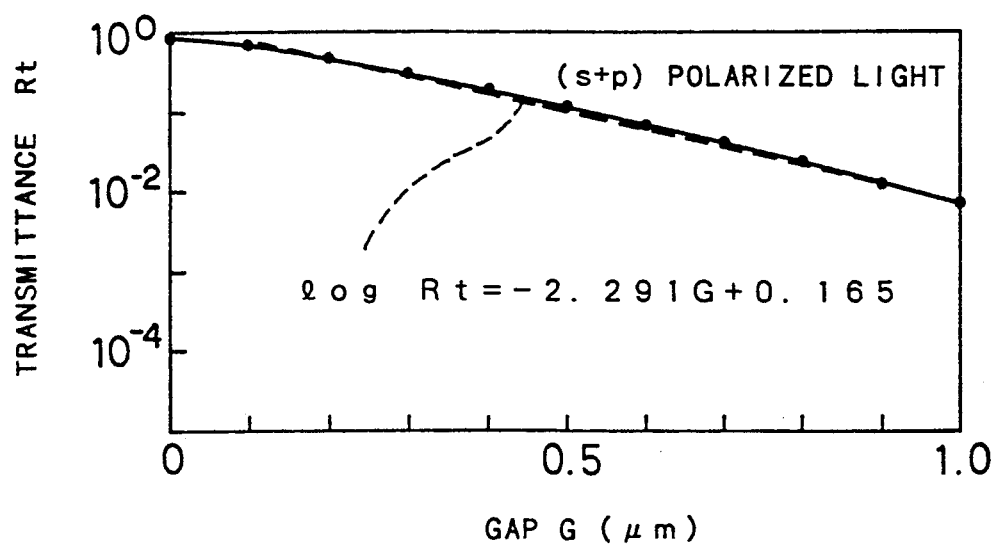
Figure 6A:
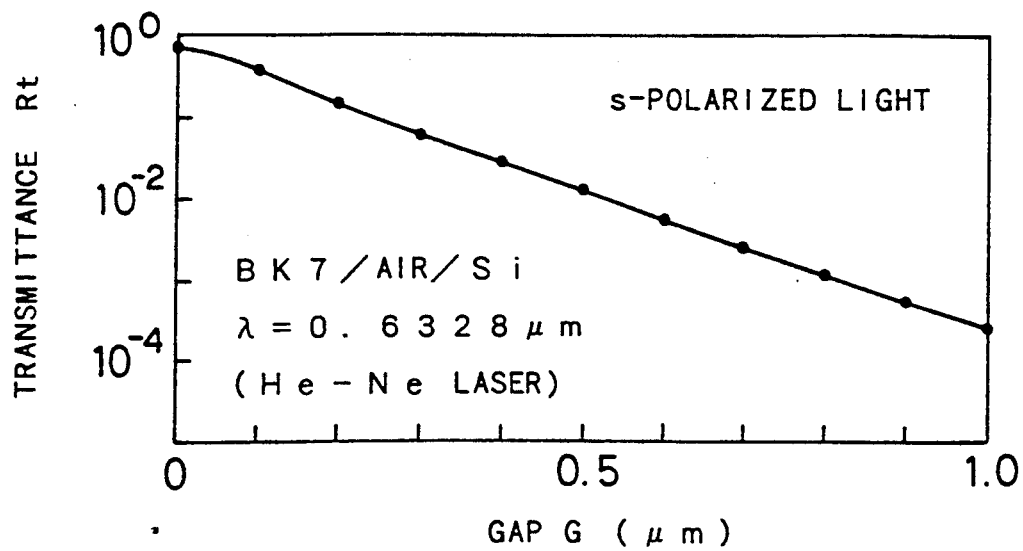
FIGS. 6A through 10B are graphs showing the transmittance plotted against the dimension of a gap under various conditions.
Figure 6B:
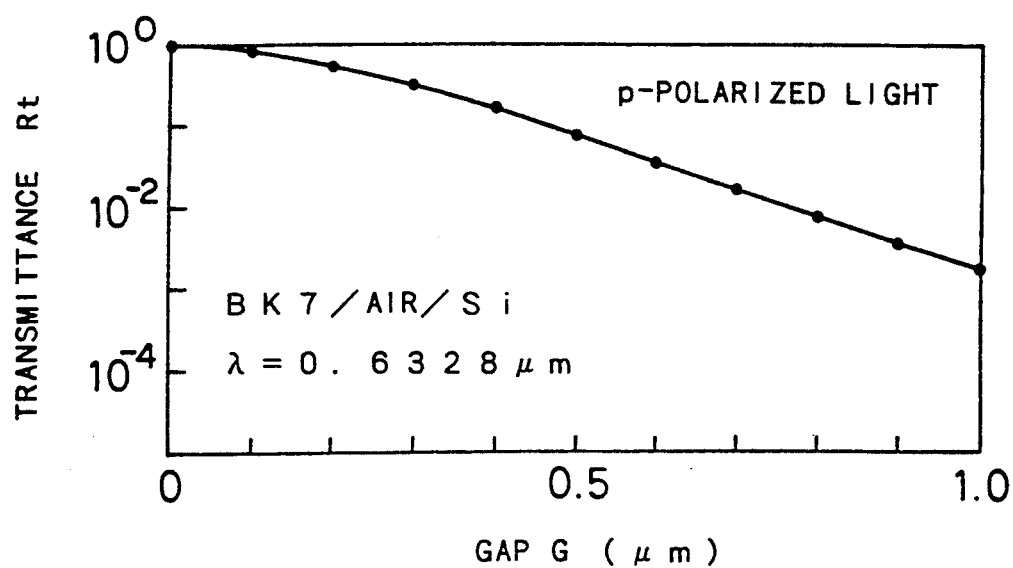
Figure 7A:
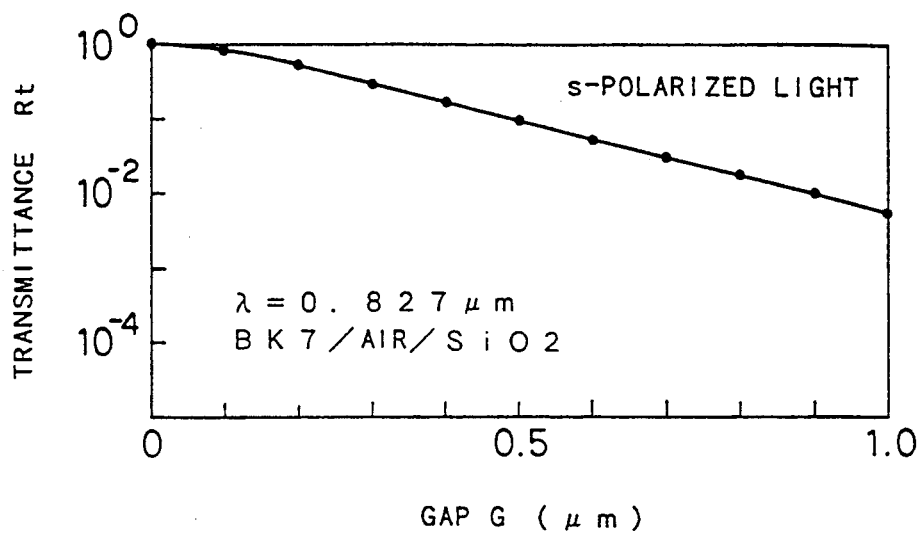
Figure 7B:
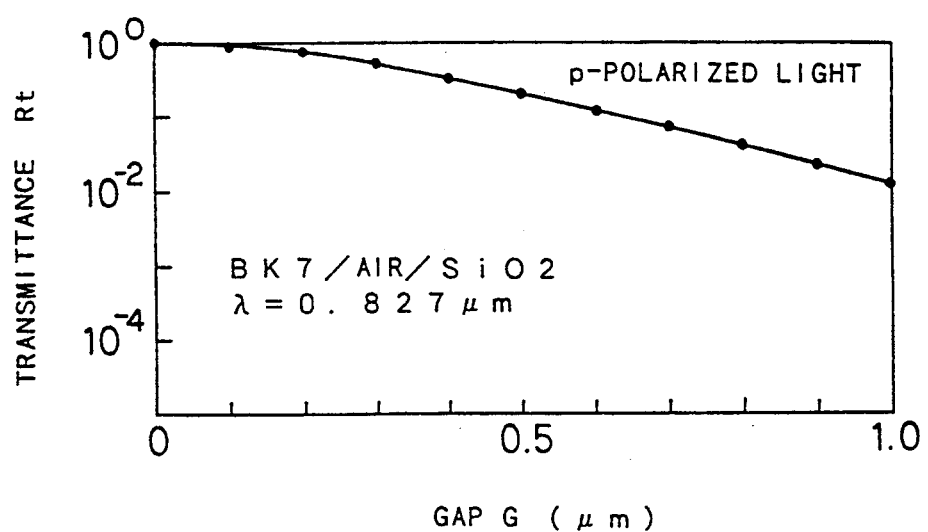
Figure 8A:
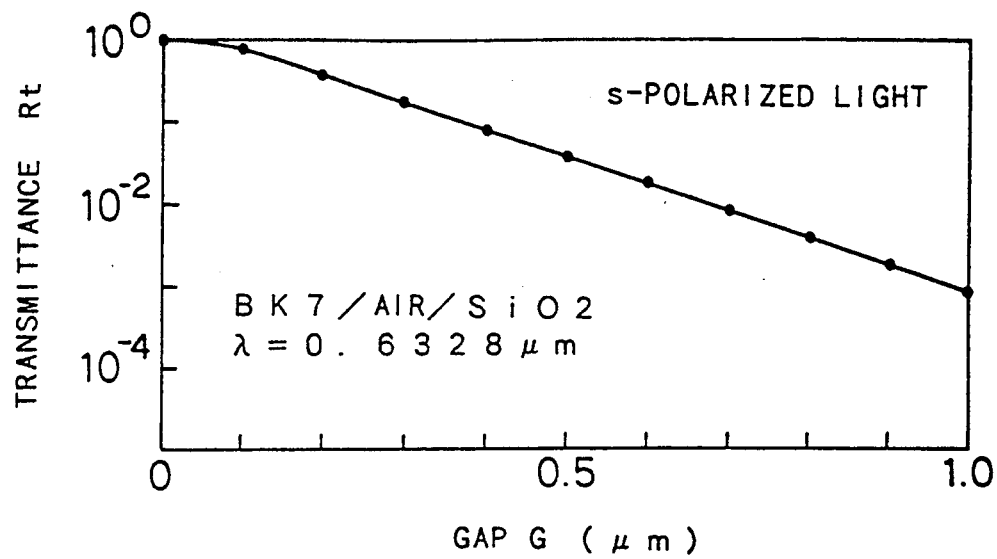
Figure 8B:
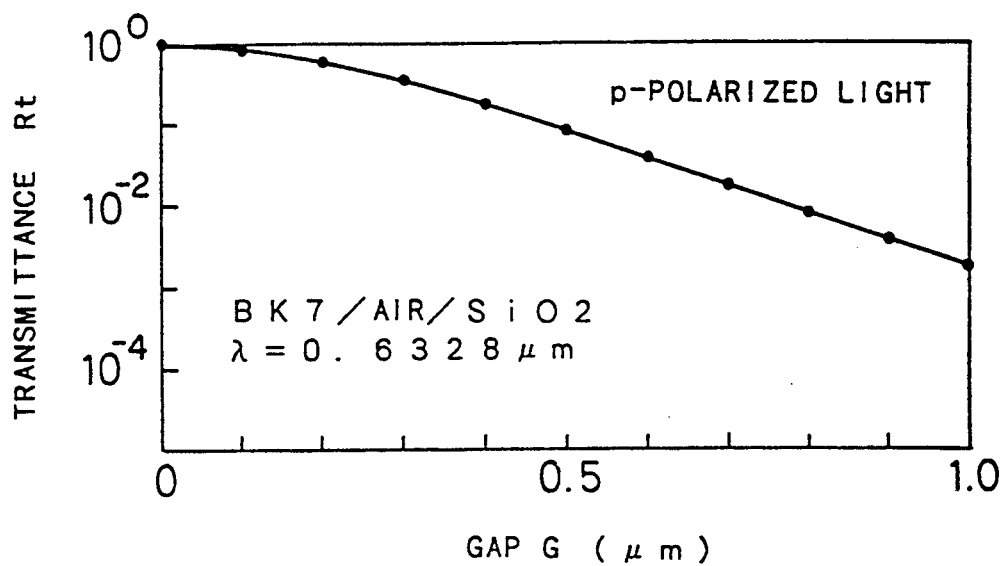
Figure 9A:
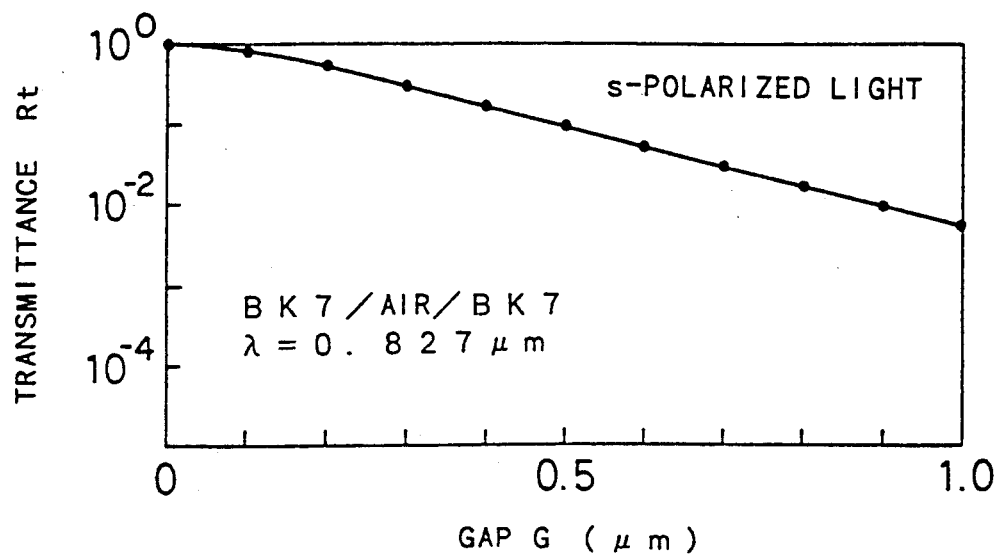
Figure 9B:
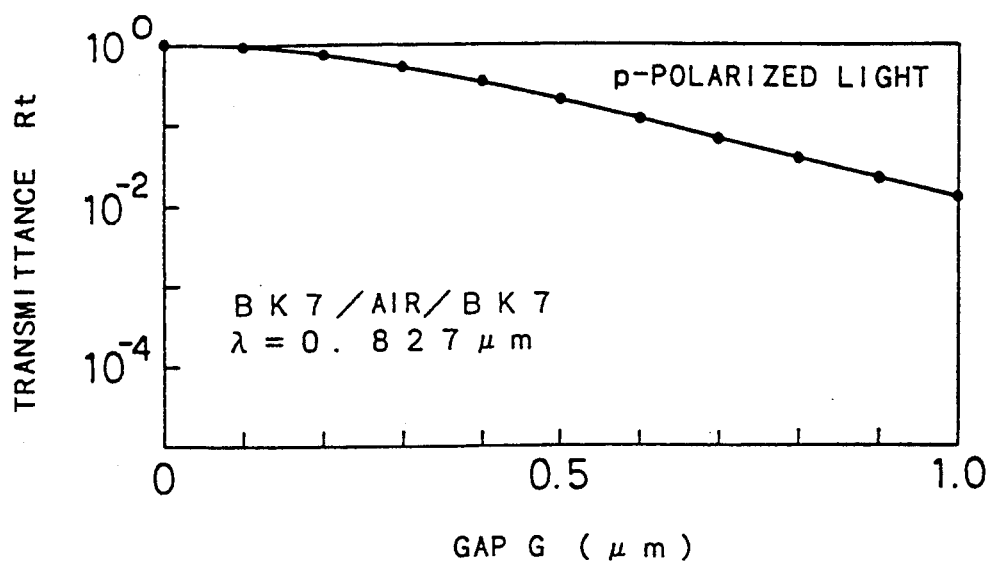
Figure 10A:
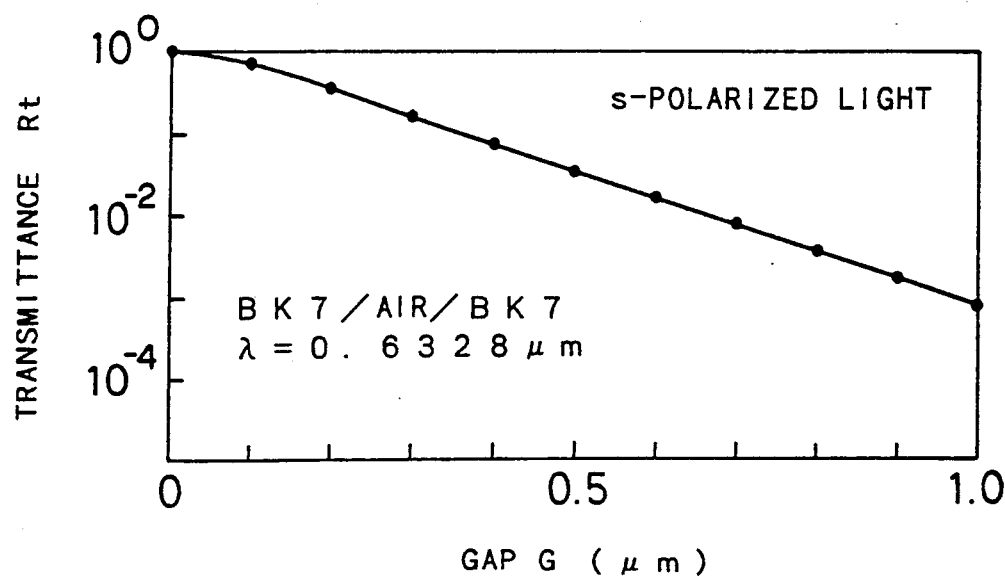
Figure 10B:
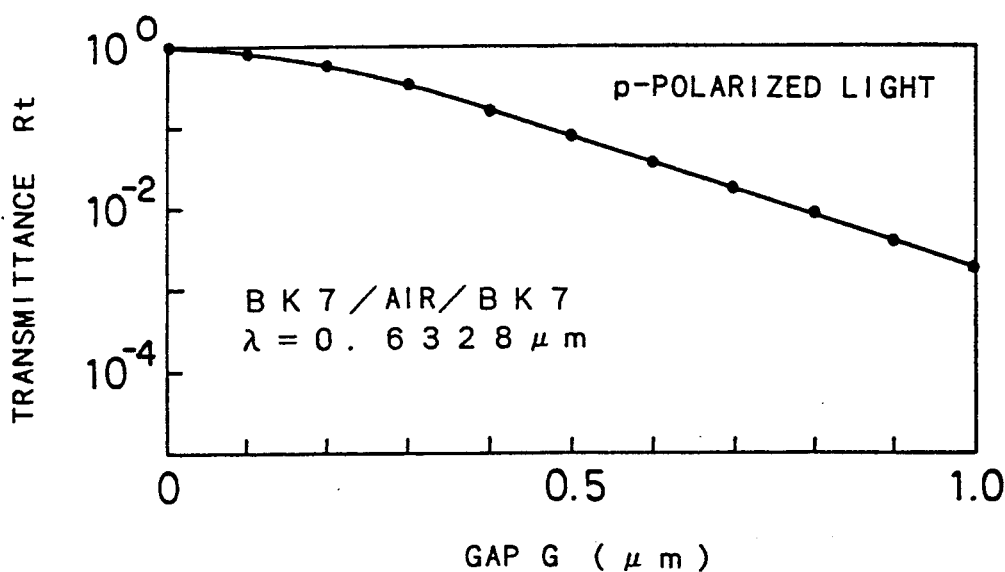

As equation (4) clearly shows, the transmittance Rt (=Pt/Pi) is equal to (1−Rr). FIGS. 5A through 5C are graphs showing the transmittance Rt plotted against the gap G. The ordinate scale for the transmittance Rt is logarithmic. The transmittance curve log(Rt) can be approximated by a straight line except for a range of the gap G near zero. Broken lines in FIGS. 5A through 5C show approximations in the range of the gap G between 0.2 and 1.0 μm and are respectively expressed as follows:

$$\log Rt = -2.642G - 0.135 \qquad \ldots (6a)$$

$$\log Rt = -2.216G - 0.345 \qquad \ldots (6b)$$

$$\log Rt = -2.291G - 0.165 \qquad \ldots (6c)$$

FIGS. 6A, 6B through FIGS. 10A, 10B show the transmittance Rt plotted against the gap G for various wavelengths of the laser beam and for various materials of the third specimen M3. The constituents of each test piece are shown in the manner of medium M1/medium M2/medium M3. The transmittance of (s+p) polarized light is omitted since it can be calculated from those of s-polarized light and p-polarized light. The transmittance curve log(Rt) plotted against the gap G is approximated by a straight line irrespective of the wavelength of the laser beam and the third medium M3.

As described above, the value of the gap G is determined by substituting the observed reflectance in that relation between the reflectance or transmittance and the gap G, which is calculated in advance.

Figure 1:
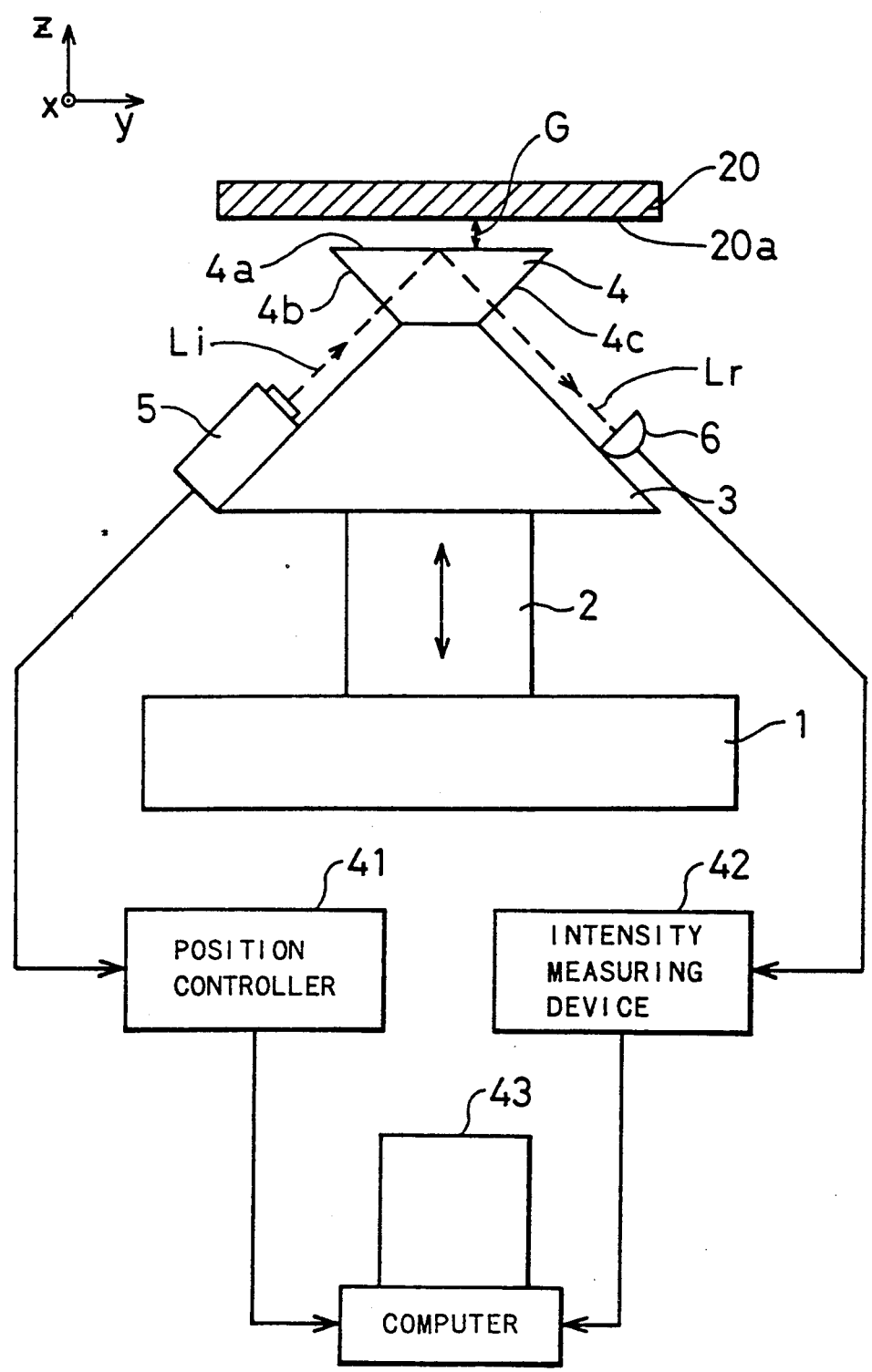
FIG. 1 is a schematic view illustrating the structure of a gap-measuring apparatus embodying the present invention.

FIG. 1 is a schematic view illustrating the structure of a gap-measuring apparatus embodying the present invention. The gap-measuring apparatus has a base 1, a piezoelectric actuator 2 attached to the base 1, and a trapezoid stand 3 further mounted on the piezoelectric actuator 2. The two slant faces of the stand 3 are formed perpendicular to each other. A prism 4 is provided on the top of the stand 3. A laser source 5, e.g., GaAlAs laser, and a photosensor 6, e.g., a photo diode, are fixed on opposite ends of the slant faces of the stand 3, respectively.

The gap measuring apparatus further comprises a position controller 41, an intensity measuring device 42, and a computer 43. The position controller 41 is connected to the piezoelectric actuator 2 and drives the same. The intensity measuring device 42 is connected to the photosensor 6 and determines the intensity of light received by the photosensor 6. The computer 43 receives outputs from the position controller 41 and the intensity measuring device 42 and determines the value of the gap G as will be described later in detail.

The prism 4 is made of borosilicate glass (BK7) and its top surface 4a is held in parallel with the surface of an x-y table (not shown) on which a specimen or test piece is fixed. The prism 4 is a rectangular prism having an incident surface 4b and an exit surface 4c perpendicular to each other. The surfaces 4b and 4c are inclined at an angle of 45 degrees to the top surface 4a. A specimen 20 is held above the prism 4 across a gap G with a holding mechanism (not shown) and has a lower face 20a approximately parallel with the top surface 4a of the prism 4.

The piezoelectric actuator 2 has a piezoelectric element extensible and contractible in the z direction. The stand 3 is movable in the z direction by controlling the voltage applied to the piezoelectric element.

A laser beam Li emitted from the laser source 5 enters the incident surface 4b of the prism 4 at an incident angle of 90 degrees and then on the top surface 4a at an incident angle of 45 degrees. Since the critical angle of incidence is 41.5 degrees under the conditions shown in Table 1, the total reflection conditions in terms of the geometrical optics are satisfied. A reflected light beam Lr perpendicularly going out through the exit surface 4c is detected by the photosensor 6.

The gap G is measured as follows: First, the gap G is maintained to be several times as long as the wavelength λ of the laser beam. The laser beam Li is then emitted and reflected by the prism 4; the photosensor 6 detects the intensity of the reflected light Lr. The laser beam Li is not transmitted through the gap which is several times the wavelength λ, but is totally reflected at the top surface 4a of the prism 4. The intensity of the reflected light Lr detected by the photosensor 6 represents the intensity Pi of the incident light Li accordingly. The stand 3 is then shifted up in the z direction by the piezoelectric actuator 2, whereby the gap G is decreased to be nearly equal to the wavelength λ.

The laser beam Li is again emitted and the intensity Pr of the reflected light Lr is detected by the photosensor 6. Part of the laser beam Li is transmitted into the specimen 20 this time. The ratio of the intensity Pr of the reflected light Lr in the this measurement to the intensity Pi of the incident light Li in the former measurement represents the reflectance Rr. The transmittance Rt ($=1-Rr$) is also obtained by calculation. For example, when the specimen 20 is made of silicon and the incident light Li is s-polarized light, the gap G responsive to the transmittance Rt can be found from FIG. 5A.

The gap G can be found with a look-up table representing, for example, the relation shown in FIG. 5A; the value of the gap G may be calculated by interpolation, if necessary. Alternatively the gap G can be found in response to the transmittance Rt according to equation (6a). The relationship between the transmittance Rt or the reflectance Rr and the gap G can be also expressed by various functions other than a linear function like the equation (6a), e.g., high order, logarithmic, and exponential functions.

Figure 11:
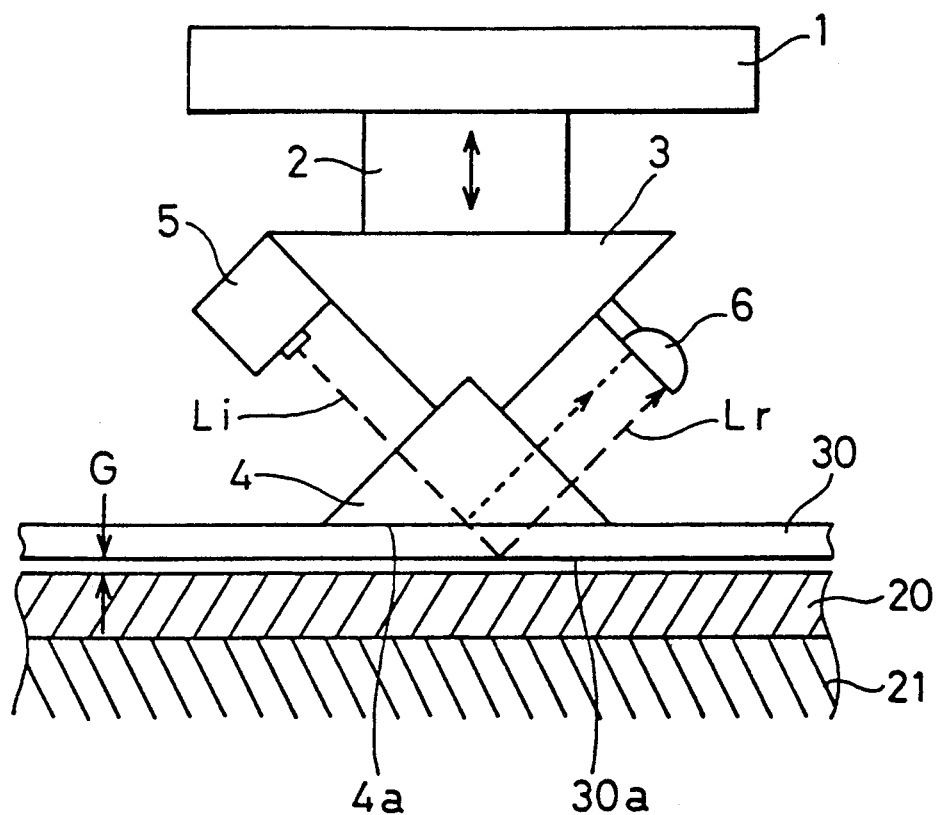
FIG. 11 is a schematic view illustrating a gap-measuring apparatus according to the present invention.

FIG. 11 is a schematic view of a proximity gap measuring apparatus according to the present invention. Proximity exposure is a method of printing a mask pattern onto flat panels of liquid crystal or on silicon wafers for semiconductor devices.

The apparatus, for example, measures a narrow gap between a photo resist applied on a silicon wafer and a photo mask in proximity exposure. The proximity gap measuring apparatus includes a base 1, a piezoelectric actuator 2, a stand 3, a prism 4, a laser sources, and a photosensor 6, as is the case with the gap-measuring apparatus of FIG. 1. These elements are oriented, upside-down to those of the apparatus shown in FIG. 1. A bottom surface 4a is in contact with a photo mask 30. The photo mask 30 is positioned above a photo resist 20 applied on a silicon wafer 21 across a gap G of about 1 μm, and is approximately in parallel with the upper surface of the photo resist 20.

The photo mask 30 is mainly composed of glass. As shown in FIG. 11, practically all of the laser beam Li emitted from the laser source 5 is transmitted through the bottom surface 4a of the prism 4 and reflected at a bottom surface 30a of the photo mask 30. The reflected light Lr then follows an optical path shown by a broken line in stead of one shown by a dotted line. The photosensor 6 has a specific receiving surface to ensure that it receives all of the reflected light Lr even when the optical path of the reflected light Lr is changed as stated above.

In the above situation, the prism 4 and the photo mask 30 as a whole act as a reflector. The photo mask 30 may be detached from the prism after measurement of the gap G.

The procedure for measuring the gap G is as follows: First, optical constants, i.e., refractive index and extinction coefficient, of the photo resist 20 applied on the silicon wafer 21 are measured by ellipsometry. At this stage, the photo mask 30 is distanced from the photo resist 20 by more than several times the wavelength λ of the laser beam. The intensity of the reflected light Lr, which is equal to that of incident light Li, is measured on this condition. Then the photo mask 30 is moved in proximity to the photo resist 20 in such a position as shown in FIG. 11, and the intensity of the reflected light Lr is measured. The dimension of the gap G is found based on the intensity of the incident light Li and that of the reflected light Lr.

The measurement of the absolute value of the gap G is not essential for repeatability of the proximity exposure as long as the gap G is controlled to have a desired constant value on every exposure. In order to achieve the constant gap G on every exposure, a distance between the photo mask 30 and the photo resist 20 is adjusted to attain a constant reflectance Rr. In this case, the optical constants of the photo resist 20 are not needed.

Figure 12:
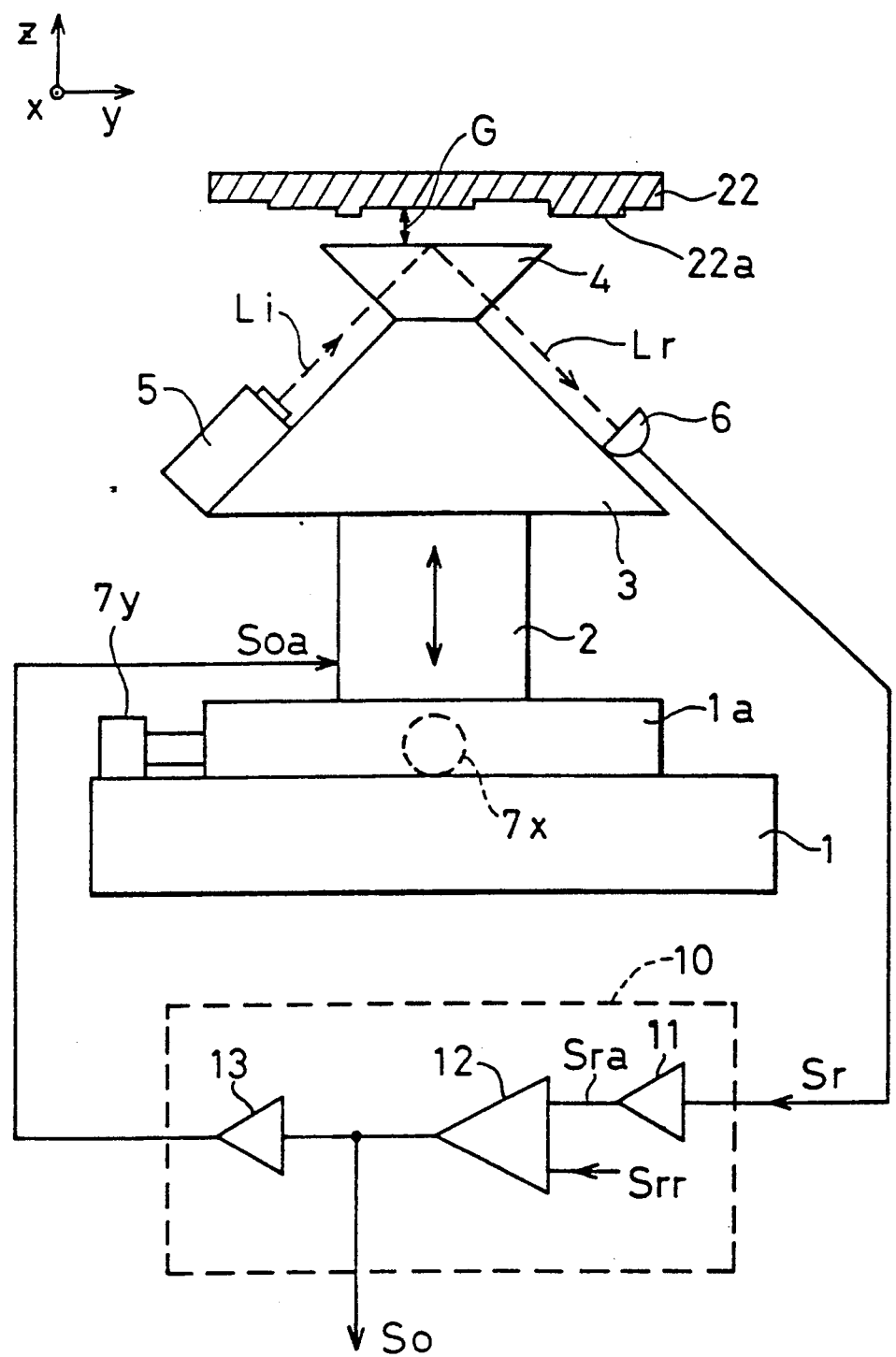
FIG. 12 is a schematic view illustrating a surface condition detecting apparatus.

FIG. 12 is a schematic view illustrating an apparatus for detecting surface condition, embodying the present invention. The apparatus is efficiently used for measuring unevenness on a surface of a specimen (or a test piece) 22. The surface condition detecting apparatus comprises an actuator 2, a stand 3, a prism 4, a laser source 5, and a photosensor 6, which are all located upon an x-y table 1a mounted on a base 1. The x-y table 1a is positioned in x and y directions with two high-precision ball screws driven by an x-direction driving motor 7x and a y-direction driving motor 7y, respectively. The apparatus further includes a servo amplifier circuit 10 having an amplifier 11, a comparator 12, and another amplifier 13 connected in series.

The unevenness of the surface 22a of the specimen 22 is measured as follows: When the photosensor 6 detects the intensity of the reflected light Lr, a signal Sr proportional to the intensity of the reflected light is supplied from the photosensor 6 to the amplifier 11. The amplifier 11 amplifies the signal Sr and supplies an amplified signal Sra to an input port of the comparator 12, which compares the amplified signal Sra with a reference signal Srr given to another input port of the comparator 12 The reference signal Srr represents a predetermined value of the gap G between the specimen 22 and the prism 4. The comparator 12 has zero-shift function; that is, the comparator 12 outputs a signal S0 whose level is shifted responsive to the relation of the levels of the signals Sra and Srr. The output signal So is amplified by the amplifier 13 to become a signal Soa, which is supplied to the piezoelectric actuator 2 for z direction. The amount of the zero-shift by the comparator 12 increases or decreases responsive to the relation of the levels of the signals Sra and Srr until the signals Sra and Srr become equal to each other. The signals So and Soa are being shifted therefore until the gap G between the specimen 22 and the prism 4 comes to be a predetermined constant value and until the signals Sra and Srr become equal to each other accordingly. Meanwhile the signal Soa drives the piezoelectric actuator 2 and moves the stand 3 in z direction. The piezoelectric actuator 2 has a piezoelectric element which extends and contracts by an amount corresponding to the input signal Soa, which is directly proportional to the signal S outputted from the comparator 12. Namely, the extension or contraction of the piezoelectric actuator 2 is in proportion to the signal So. Accordingly the unevenness on the surface 22a of the specimen 22 can be found by converting the signal So into the amount of extension and contraction of the piezoelectric actuator 2.

The servo amplifying circuit 10 may be removed from the proximity gap measuring apparatus; in this case, the gap G is measured according to the relation between the transmittance or the reflectance and the gap G, such as that shown in FIG. 5A, while using the signal Sr outputted from the photosensor 6 as a signal representing the value of the transmittance or the reflectance. In this case, variation of the gap G on the x-y plane is measured by shifting the x-y table 1a with the motors 7x and 7y. The variation of the gap G represents unevenness on the surface 22a of the specimen 22.

Although GaAlAs and He-Ne lasers are preferably used in the above embodiment, they are replaceable with any other lasers. The wavelength of the laser beam depends upon the type of laser. The preferable size of a gap between the specimen and the prism or photo mask is one tenth to twice as long as the wavelength of the laser beam, or more particularly almost the same as the wavelength, for precise measurement with the gap-measuring apparatus or the surface condition detecting apparatus. A suitable laser source for precise measurement can therefore be chosen according to the dimension of a gap to be measured.

The specimen may be made of any materials, such as glass, silicon, silicon oxides, and photo resists. Materials with known optical constants are preferable because the use of those materials makes it easier to find the absolute value of the gap.

The piezoelectric actuator 2 may drive the specimen 20 or 22 in stead of the stand 3. Another driving mechanism (or a first driving mechanism) for relatively moving the specimen and the prism in the direction varying the gap may be used in stead of the piezoelectric actuator 2. The piezoelectric actuator is, however, preferable since it controls a distance less than 1 micrometer with high precision. The driving motors 7x and 7y may be replaced by another driving mechanism (or a second driving mechanism) for relatively moving the specimen 22 and the x-y table 1a within a surface perpendicular to the direction varying the gap.

When a laser beam is reflected by a reflector upon the total reflection condition in terms of the geometrical optics, part of the laser beam impinging on the reflecting surface is transmitted through a narrow gap into an opposite specimen by the "tunnel effect". Since the intensity of the transmitted light varies with the dimension of the gap, the narrow gap and unevenness on the surface can be measured with high precision on the basis of the intensity of the reflected light.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for measuring a gap between a surface of a specimen and a specific member comprising:
    a laser source for emitting a laser beam of linearly polarized light having a known wavelength;
    a light transmission reflector having a reflecting surface comprising said specific member located substantially parallel to said surface of said specimen across the gap for reflecting said laser beam at said reflecting surface such that geometric optical total reflection occurs;
    a photosensor for measuring intensity of said laser beam reflected by said reflecting surface of said reflector;
    a base on which said laser source, said reflector, and said photosensor are mounted;
    a first driving mechanism for relatively moving at least one of said base and said specimen in a first direction defining said gap; and
    gap determining means for comparing said intensity of said reflected laser beam with calculated values of said intensity according to Maxwell's equations on the condition of total reflection with respect to said gap, thereby determining said gap as a function of said intensity of said reflected laser beam.

2. A gap measuring device in accordance with claim 1, wherein:
    said gap is in the range of one tenth of a wavelength of said laser beam to two times said wavelength.

3. A gap measuring device in accordance with claim 2, wherein:
    said gap is less than 1 μm.

4. A gap measuring device in accordance with claim 3, wherein:
    said first driving mechanism comprises a piezoelectric element, and said light transmission reflector comprises a prism.

5. A gap measuring device in accordance with claim 1, further comprising:
    a second driving mechanism for relatively moving at least one of said base and said specimen in a second direction perpendicular to said first direction.

6. A gap measuring device in accordance with claim 5, wherein:
    said gap determining means comprises means for comparing said intensity of said reflected laser beam with a calculated value of said intensity according to Maxwell's equations on the condition of total reflection with respect to said gap, thereby determining said gap.

7. A gap measuring device in accordance with claim 6, wherein:
    said first drive mechanism comprises means for relatively moving said base and said specimen so that a value of said gap determined by said gap determining means becomes equal to a prescribed value, thereby maintaining said gap at said prescribed value.

8. A gap measuring device in accordance with claim 7, wherein:
    said gap determining means comprises means for determining unevenness of at least a part of said surface of said specimen on the basis of movement of said first drive mechanism in said first direction at each position in said part of said surface.

9. A gap measuring device in accordance with claim 8, wherein:
    said gap is in the range of one tenth of a wavelength of said laser beam to two times of said wavelength.

10. A gap measuring device in accordance with claim 9, wherein
    said gap is less than 1 μm.

11. A gap measuring device in accordance with claim 10, wherein
    said laser beam is linearly polarized light.

12. A gap measuring device in accordance with claim 11, wherein
    said first and second driving mechanisms comprise a piezoelectric element, and said light transmission reflector is a prism.

13. A method for measuring the gap between the surface of a specimen and a specific member comprising the steps of:

(a) emitting a laser beam of linearly polarized light having a known wavelength incident on a reflecting surface of a light transmission reflector, said reflecting surface comprising said specific member located substantially parallel to said surface of said specimen across a gap;

(b) reflecting said layers of beam at said reflecting surface such that geometric optical total reflection occurs;

(c) measuring intensity of said laser beam reflected by said reflecting surface; and (d) determining said gap by comparing said intensity of said reflected laser beam with calculated values of said intensity according to Maxwell's equation on the condition of total reflection with respect to said gap, thereby determining said gap as a function of said intensity of said reflected laser beam.

14. A gap measuring method in accordance with claim 13, wherein:
said gap is in the range of one tenth of a wavelength of said laser beam to two times said wavelength.

15. A gap measuring method in accordance with claim 14, wherein:
said gap is less than 1 μm.

16. A gap measuring method in accordance with claim 13, wherein:
said step (d) comprises the step of:
(d-1) relatively moving said light transmission reflector and said specimen in a direction defining said gap so that a value of said gap becomes equal to a prescribed value, thereby maintaining said gap at said prescribed value.

17. A gap measuring method in accordance with claim 16, wherein:
said step (d-1) is performed at plural positions of at least a part of said surface of said specimen, and said step (d) further comprises the step of:
(d-2) determining unevenness of said part on the basis of relative movement of said light transmission reflector and said specimen in said direction at each position in said part of said surface.

18. A gap measuring method in accordance with claim 17, wherein:
said gap is in the range of one tenth of a wavelength of said laser beam to two times said wavelength.

19. A gap measuring method in accordance with claim 18, wherein:
said gap is less than 1 μm.

20. A gap measuring method in accordance with claim 13, wherein:
said step of emitting a laser beam comprises emitting a laser beam comprising linearly polarized light.

21. Apparatus for measuring a gap between a surface of a specimen and a substantially parallel surface comprising:
a source of radiant energy for emitting a radiant energy beam of linearly polarized light having a known wavelength;
a radiant energy transmission reflector having a reflecting surface, said reflecting surface comprising said parallel surface, said reflecting surface reflecting said radiant energy such that, if a gap is at least several wavelengths of said radiant energy, said reflecting surface substantially totally reflects' said radiant energy;
a photosensor for measuring the intensity of said radiant energy reflected by said reflecting surface of said reflector;
a base for supporting said radiant energy source, reflector and said photosensor;
first driving means for relatively moving said base and said specimen in a direction corresponding to the direction of said gap; and
gap determining means for comparing said intensity of said reflected radiant energy with calculated values of said intensity according to Maxwell's equation on the condition of total reflection with respect to said gap, thereby determining said gap as a function of said intensity of said reflected radiant energy.

22. Apparatus in accordance with claim 21, wherein said radiant energy source comprises a laser source and said radiant energy beam comprises a reflected radiant energy.

23. Apparatus in accordance with claim 22, wherein:
said gap is in the range of one-tenth of a wavelength of said laser beam to two times said wavelength.

24. Apparatus in accordance with claim 23, wherein:
said gap is less than 1 μm.

25. Apparatus in accordance with claim 24, wherein:
said first driving means comprises a piezoelectric element, and said light transmission reflector comprises a prism.

26. Apparatus in accordance with claim 22, further comprising:
a second driving means for relatively moving at least one of said base and said specimen in a second direction perpendicular to said first direction.

27. Apparatus in accordance with claim 26, wherein:
said gap determining means comprises means for comparing said intensity of said reflected laser beam with a calculated value of said intensity according to Maxwell's equations on the condition of total reflection with respect to said gap, thereby determining said gap.

28. Apparatus in accordance with claim 27, wherein:
said first driving means comprises means for relatively moving said base and said specimen so that a value of said gap determined by said gap determining means becomes equal to a prescribed value, thereby maintaining said gap at said prescribed value.

29. Apparatus in accordance with claim 28, wherein:
said gap determining means comprises means for determining unevenness of at least a part of said surface of said specimen on the basis of movement of said first driving means in said first direction at each position in said part of said surface.

30. Apparatus in accordance with claim 29, wherein:
said gap is in the range of one-tenth of a wavelength of said laser beam to two times said wavelength.

31. Apparatus in accordance with claim 30, wherein:
said gap is less than μm.

32. Apparatus in accordance with claim 31, wherein;
said laser source generates a laser beam comprising linearly polarized light.

33. Apparatus in accordance with claim 32, wherein:
said first and second driving means each comprise a piezoelectric element, and said light transmission reflector comprises a prism.

34. Apparatus for maintaining a gap between a surface of a specimen and a specific member at a prescribed value, comprising:
a laser source for emitting a laser beam of linearly polarized light having a known wavelength;

a light transmission reflector having a reflecting surface comprising said specific member located substantially parallel to said surface of said specimen across the gap for reflecting said laser beam at said reflecting surface;

a photosensor for measuring intensity of said laser beam reflected by said reflecting surface of said reflector;

a base on which said laser source, said reflector and said photosensor are mounted;

first driving means for relatively moving at least one of said base and said specimen in a first direction defining said gap;

gap determining means for comparing said intensity of said reflected laser beam with calculated values of said intensity according to Maxwell's equations on the condition of total reflection with respect to said gap, thereby determining said gap as a function of said intensity of said reflected laser beam, said first driving means comprising means for relatively moving said base and said specimen so that a value of said gap determined by said gap determining means becomes equal to said prescribed value, thereby maintaining said gap at said prescribed value.

35. Apparatus in accordance with claim 34, wherein: said gap is in the range of one-tenth of a wavelength of said laser beam to two times said wavelength.

36. Apparatus in accordance with claim 35, wherein: said gap is less than 1 μm.

37. Apparatus in accordance with claim 36, wherein: said first driving means comprises a piezoelectric element, and said light transmission reflector comprises a prism.

38. Apparatus in accordance with claim 36, further comprising:

a second driving means for relatively moving said base and said specimen in a second direction perpendicular to said first direction.

39. A device for measuring the unevenness of a surface of a specimen comprising:

a laser source for emitting a laser beam of linearly polarized light having a known wavelength;

a light transmitting reflector having a reflecting surface comprising a surface located substantially parallel to the surface of said specimen, thereby defining a gap between said surface of said specimen and said substantially parallel surface, said reflecting surface reflecting said laser beam;

a photosensor for measuring intensity of said laser beam reflected by said reflecting surface of said reflector;

a base on which said laser source, said reflector and said photosensor are mounted;

a first driving means for relatively moving said base and said specimen in a first direction defining said gap;

gap determining means for comparing said intensity of said reflected laser beam with calculated values of said intensity according to Maxwell's equations on the condition of total reflection with respect to said gap, thereby determining said gap as a function of said intensity of said reflected laser beam, said gap determining means comprising means for controlling said first driving means to maintain said gap at a prescribed value, the unevenness of at least a part of said surface of said specimen being determined on the basis of movement of said first drive means in said first direction at each position in said part of said surface.

40. Apparatus in accordance with claim 39, wherein: said gap is in the range of one-tenth of a wavelength of said laser beam to two times said wavelength.

41. Apparatus in accordance with claim 40, wherein: said gap is less than 1 μm.

42. Apparatus in accordance with claim 41, wherein: said first driving means comprises a piezoelectric element, and said light transmission reflector comprises a prism.

43. Apparatus in accordance with claim 39, further comprising:

a second driving means for relatively moving said base and said specimen in a second direction perpendicular to said first direction.

44. A method for measuring a gap between a surface of a specimen and a surface substantially parallel to the surface of the specimen comprising the steps of:

(a) emitting a radiant energy beam of linearly polarized light having a known wavelength incident on a reflecting surface of a radiant energy transmission reflector, said reflecting surface comprising said substantially parallel surface;

(b) reflecting said radiant energy beam at said reflecting surface such that when said radiant energy beam reflects from said reflecting surface once said gap is substantially more than several wavelengths of said radiant energy, said radiant energy is substantially and entirely reflected, but once said gap is on the order of less than two wavelengths of said radiant energy, a portion of said radiant energy is transmitted through said gap to said surface of said specimen;

(c) measuring the intensity of said radiant energy reflected by said reflecting surface; and (d) comparing said intensity of said reflected radiant energy with calculated values of said intensity according to Maxwell's equations on the condition of total reflection with respect to said gap, thereby determining said gap as a function of said intensity of said reflected radiant energy.

45. A gap measuring method in accordance with claim 44, wherein:

said gap is in the range of one-tenth of a wavelength of said laser beam to two times said wavelength.

46. A gap measuring method in accordance with claim 45, wherein:

said gap is less than 1 μm.

47. A gap measuring method in accordance with claim 44, wherein:

said step (d) comprises the step of:

(d-1) relatively moving said light transmission reflector and said specimen in a direction defining said gap so that a value of said gap becomes equal to a prescribed value, thereby maintaining said gap at said prescribed value.

48. A gap measuring method in accordance with claim 47, wherein:

said step (d-1) is performed at plural positions of at least a part of said surface of said specimen, and said step (d) further comprises the step of:

(d-2) determining unevenness of said part on the basis of relative movement of said light transmission reflector and said specimen in said direction at each position in said part of said surface.

49. A gap measuring method in accordance with claim 48, wherein:

said radiant energy comprises a laser beam; and said gap is in the range of one-tenth of a wavelength of said laser beam to two times said wavelength.

50. A gap measuring method in accordance with claim 49, wherein:

said gap is less than 1 μm.

51. A gap measuring method in accordance with claim 50, wherein:

said step of emitting a laser beam comprises emitting a laser beam comprising linearly polarized light.

52. A method for maintaining a gap at a prescribed value between a surface of a specimen and a surface substantially parallel to the surface of the specimen comprising the steps of:

(a) emitting a laser beam of linearly polarized light having a known wavelength incident on a reflecting surface of a light transmission reflector, said reflecting surface comprising said specific member located substantially parallel to said surface of said specific member across the gap;

(b) reflecting said laser beam at said reflecting surface;

(c) measuring intensity of said laser beam reflected by said reflecting surface;

(d) comparing said intensity of said reflected laser with calculated values of said intensity according to Maxwell's equations on the condition of total reflection with respect to said gap, thereby determining said gap as a function of said intensity of said reflected laser beam; and (d) relatively moving said light transmission reflector and said specimen in a direction defining said gap so that the value of said gap becomes equal to the prescribed value, thereby maintaining said gap.

53. A gap measuring method in accordance with claim 52, wherein:

said gap is in the range of one-tenth of a wavelength of said laser beam to two times aid wavelength.

54. A gap measuring method in accordance with claim 53, wherein:

said gap is less than 1 μm.

55. A gap measuring method in accordance with claim 54, wherein:

said step (e) is performed at plural positions of at least a part of said surface of said specimen, and said step (d) further comprises the step of:

(d-2) determining unevenness of said part on the basis of relative movement of said light transmission reflector and said specimen in said direction at each position in said part of said surface.

56. A method for determining the unevenness of the surface of a specimen comprising the steps of (a) emitting a laser beam of linearly polarized light having a known wavelength incident on a reflecting surface of a light transmission reflector, said reflecting surface comprising said specific member located substantially parallel to said surface of said specimen across a gap;

(b) reflecting said laser beam at said reflecting surface;

(c) measuring intensity of said laser beam reflected by said reflecting surface;

(d) comparing said intensity of said reflected laser beam with calculated values of said intensity according to Maxwell's equations on the condition of total reflection with respect to said gap, thereby determining said gap as a function of said intensity of said reflected laser beam; and (e) relatively moving said light transmission reflector and said specimen in a direction defining said gap so that a value of said gap becomes equal to a prescribed value, thereby maintaining said gap at said prescribed value, said step of relatively moving being performed at plural locations at least a part of said surface of said specimen, and further comprising the step of determining unevenness of said part on the basis of said relative movement of said light transmission reflector and said specimen in said direction at each position in said part of said surface.

57. A method in accordance with claim 56, wherein:

said gap is in the range of one-tenth of a wavelength of said laser beam to two times said wavelength.

58. A method in accordance with claim 57, wherein:

said gap is less than 1 μm.

* * * * *